United States Patent [19]

Siorek

[11] 4,325,468
[45] Apr. 20, 1982

[54] SUSPENSION CONTROL VALVE USING CONED SPRING DISKS

[75] Inventor: Richard W. Siorek, Warren, Mich.

[73] Assignee: The United States of America as represented by the Secretary of the Army, Washington, D.C.

[21] Appl. No.: 8,225

[22] Filed: Jan. 31, 1979

[51] Int. Cl.³ .............................................. F16F 9/34
[52] U.S. Cl. .................................. 188/282; 137/529; 188/322.14; 188/322.15
[58] Field of Search ............... 188/282, 315, 317, 322; 137/529

[56] References Cited

U.S. PATENT DOCUMENTS

| | | | |
|---|---|---|---|
| 2,025,240 | 12/1935 | Higham | 137/529 |
| 2,802,675 | 8/1957 | Ross | 188/315 |
| 2,911,022 | 11/1959 | Schedl et al. | 188/315 |
| 2,941,629 | 6/1960 | Rohacs | 188/322 |
| 4,076,276 | 2/1978 | Wijnhoven et al. | 188/315 |

FOREIGN PATENT DOCUMENTS

| | | | |
|---|---|---|---|
| 920709 | 10/1954 | Fed. Rep. of Germany | 188/315 |
| 1081439 | 12/1954 | France | 188/315 |

*Primary Examiner*—Edward R. Kazenske
*Attorney, Agent, or Firm*—Peter A. Taucher; John E. McRae; Nathan Edelberg

[57] ABSTRACT

In a vehicle wherein road wheel travel is controlled by a hydraulic damper whose flow is controlled by a spring-urged metering valve, the improvement wherein the valve spring comprises a helical spring having a constant load-deflection curve and a plurality of coned spring disks having variable load-deflection curves. The preferred suspension for cross-country operation exhibits a relatively hard response to minor bumps, a soft floating response to major bumps, and a comparatively hard snubber-like response to abnormally large bumps. Movement in the rebound direction can be substantially unrestricted, controlled by conventional springs, or controlled by spring stacks similar to those described herein. Conversely, for operation on hard surfaced roads the major control functions could be reversed.

1 Claim, 10 Drawing Figures

SUSPENSION CONTROL VALVE USING CONED SPRING DISKS

The invention described herein may be manufactured, used, and licensed by or for the Government for governmental purposes without payment to me of any royalty thereon.

BACKGROUND AND SUMMARY OF THE INVENTION

This invention relates to hydraulic dampers for wheeled or tracked vehicles. Vehicle wheel dampers are old in the art as represented by U.S. Pat. Nos. 2,060,590; 2,107,974; 2,546,051; 2,911,072 and 3,007,550. The present invention relates to a hydraulic damper designed to achieve an improved force-flow curve, hence an improved response to terrain disturbance.

Dampers are used in vehicles to control wheel travel and to maintain suspension force at a reasonably constant value. When a vehicle not equipped with dampers travels over rough terrain the road wheel is apt to experience an abnormally high upward acceleration as it impacts on a positive terrain disturbance (rock, log, back edge of a hole, etc.). Sometimes the wheel lifts off the terrain, leaving the hull in an unsupported condition. Resultant dropping movement of the hull can provide very high loads on the wheel-spring system, as well as disturbing the vehicle attitude. A single terrain disturbance (bump, hole, etc.) can produce multiple upward-downward excursions of the road wheel.

A vehicle equipped with dampers experiences lesser disturbances to the vehicle attitude, reduced shock loadings on the wheel-spring system, and improved wheel-terrain engagement (less lift-off and bounce). Dampers produce these desirable effects by limiting the upward acceleration that the wheel can experience when it impacts a bump or other terrain disturbance. The damper of the present invention achieves the desired acceleration-limiting action while at the same time permitting a relatively large total wheel travel (necessary when the vehicle is traversing large bumps or obstacles).

The hydraulic damper of this invention includes a special metering valve in a hydraulic flow passage system that controls movement of a piston-cylinder mechanism trained between the vehicle sprung mass and unsprung mass. Metering valve movement is controlled by a spring mechanism, such that the piston-cylinder unit exerts a substantial wheel deceleration effect when the wheel initially encounters a bump, a lessened deceleration effect as the wheel velocity increases (as when traversing a medium size disturbance), and a resilient snubber action as the wheel approaches the upper limits of its desirable velocities. The damper responds quickly to terrain disturbances without unduly restricting upward wheel travel. Wheel movement in the down (rebound) direction is substantially unrestricted so that the wheel is able to follow terrain undulations with a minimum of bounce or lift-off.

The invention makes it feasible to shape or structure the damper force-flow curve in a manner not previously thought possible.

THE DRAWINGS

Figure 1:
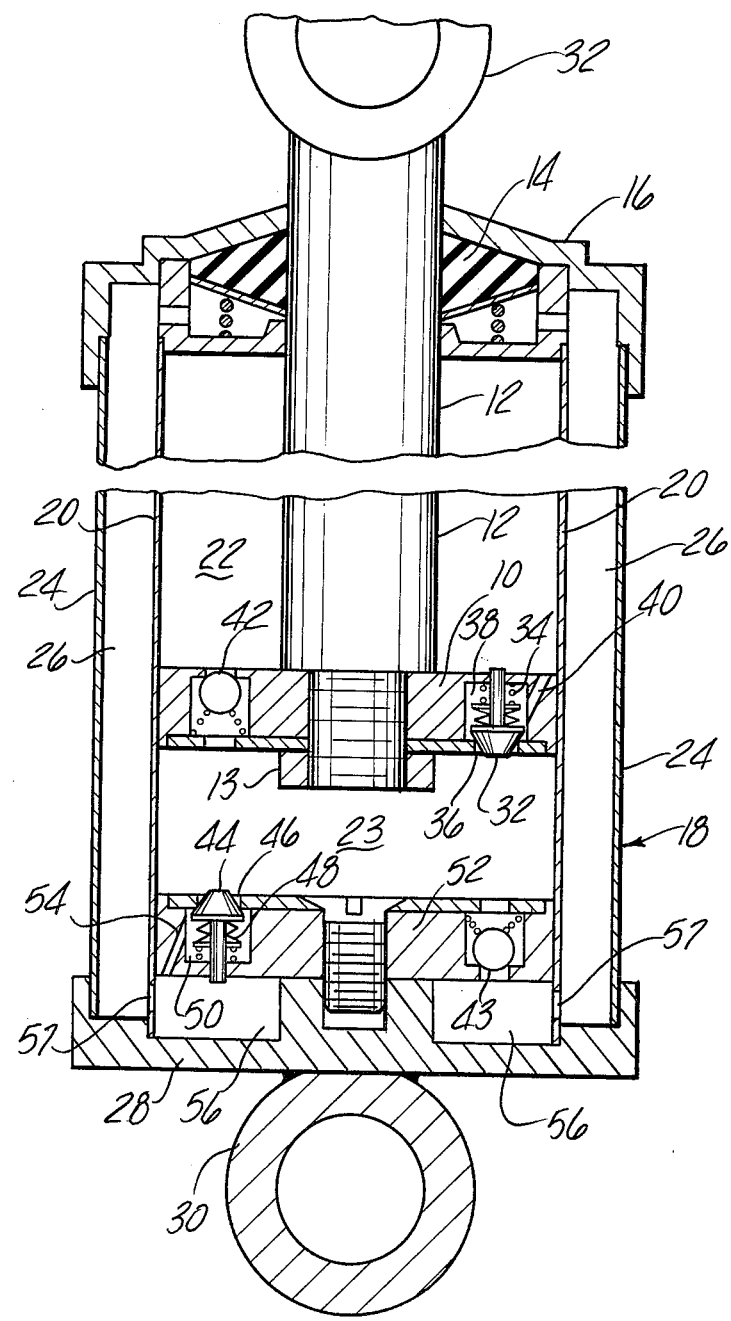
FIG. 1 is a sectional view of a suspension for one wheel of a vehicle, constructed according to my invention.

FIG. 1 illustrates one specific hydraulic damper constructed according to the present invention. Structurally the damper comprises a piston 10 affixed to a piston rod 12 by means of a nut 13. The piston rod slidably extends through a seal 14 carried by the end wall 16 of a double-walled cylinder 18; seal construction is similar to that shown in U.S. Pat. No. 3,007,550. The central space within cylinder wall 20 constitutes a working chamber 22. The annular space between concentric walls 20 and 24 constitutes a liquid reservoir 26. Liquid completely fills the central space within wall 20 (above and below the piston) and partially fills the annular space 26. Lower end wall 28 of the cylinder carries an eye 30 for swingable attachment to the unsprung mass, i.e. a road arm or axle. Piston rod 12 carries an eye 32 for swingable attachment to the sprung mass, i.e. the hull, frame or body of the vehicle.

The illustrated damper is used in parallel with a conventional non-illustrated spring trained between the sprung mass (hull) and unsprung mass (road wheel). Under static, at-rest conditions the non-illustrated spring resiliently bears the load presented by the sprung mass such that the liquid above and below piston 10 is substantially depressurized. During movement of the vehicle over rough terrain, when the road wheel encounters a positive disturbance (a bump) cylinder 18 is moved upwardly relative to piston 10. When the road wheel encounters a negative disturbance (a hole) the non-illustrated spring forces the road wheel downward, thereby causing cylinder 18 to be pulled downwardly relative to piston 10.

When cylinder 18 is moved upwardly on piston 10 a hydraulic force is applied to the lower face of a metering valve element 32. The valve element is forced upwardly against the biasing force of spring mechanism 34, thereby allowing pressurized liquid to flow through orifice 36 to a small chamber 38 within the piston. Liquid is passed from chamber 38 through passage 40 to the space above piston 10. During this period check valve 42 remains in a closed condition.

During upward movement of cylinder 18 the liquid below piston 10 also exerts a downward force on a second metering valve element 44 that is normally biased closed against orifice 46 by spring mechanism 48. The valve element is moved downwardly to permit liquid flow into a small chamber 50 in an insert 52 carried by cylinder end wall 28. Passage 54 transfers the pressurized liquid from chamber 50 to space 56 that is in free unobstructed communication with annular reservoir 26 (via openings 57 in wall 20). While metering valve element 44 is transferring liquid from space 23 to space 56 the check valve 43 is in a closed condition. Passages 40 and 54 are sufficiently large that they do not exert primary throttling actions on liquid flow. In practice each of these passages may comprise more than one passageway.

The relative liquid quantities flowing through orifices 36 and 46 are a function of the cross sectional area of piston rod 12 in relation to the cross sectional area of cylindrical space 23 (circumscribed by wall 20). Assuming rod 12 has an area one quarter that of space 23, then three quarters of the liquid will flow upwardly through orifice 36 and one quarter will flow downwardly through orifice 46.

Typically, though not necessarily, the springs associated with check valves 42 and 43 are very weak relative to spring mechanisms 34 and 48. During downward movement of cylinder 18 on piston 10 liquid above piston 10 opens valve 42 and flows into space 23. Since the chamber area below the piston is greater than the area above the piston the downflow into space 23 is insufficient to maintain space 23 in a filled condition; therefore liquid in space 56 flows upwardly through check valve 43 to maintain space 23 in a filled condition.

In summary, when cylinder 18 is moved upwardly on piston 10 liquid is caused to flow out of space 23 through metering valves 32 and 44; when cylinder 18 is moved downwardly on piston 10 liquid is caused to flow into space 23 through valves 42 and 43. The flow out of space 23 is throttled or metered because spring mechanisms 34 and 48 are relatively stiff, whereas the return flow into space 23 is substantially unrestricted because the springs associated with check valves 42 and 43 are comparatively light in a cross country vehicle application.

Figure 2:
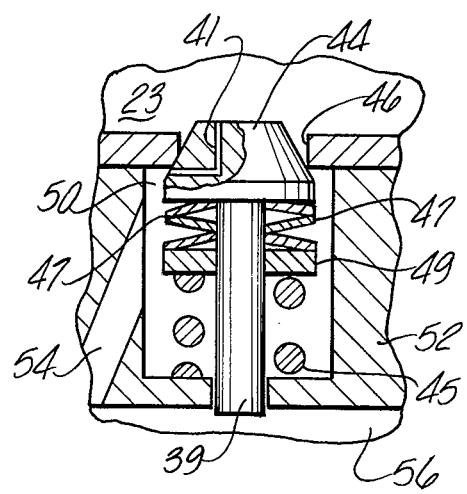
FIGS. 2 through 4 are enlarged sectional views of control valves that can be used in the FIG. 1 suspension damper.
Figure 3:
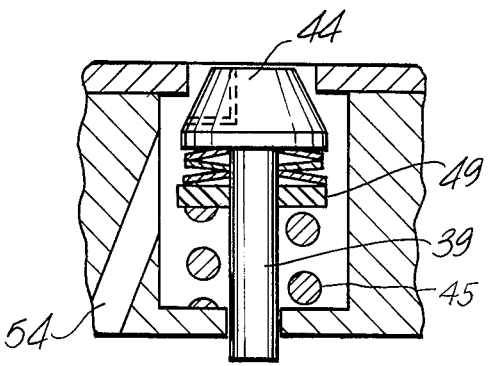
Figure 4:
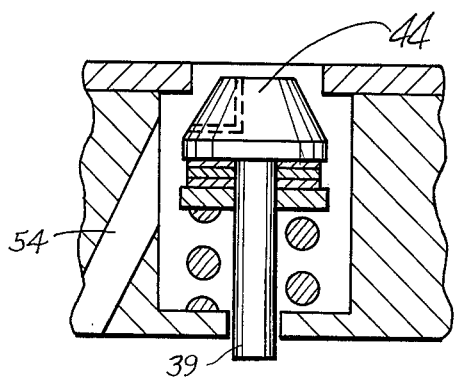

My invention relates particularly to the spring mechanisms used with metering valves 32 and 44. FIGS. 2, 3 and 4 illustrate one form that each of the spring mechanisms can take. As shown in FIG. 2 the spring mechanism comprises a helical coil spring 45 and three coned spring disks or Belleville washers 47 encircling a stem 39 that extends axially from valve element 44. Disks 47 are spaced from spring 45 by a floating washer 49. Valve element 44 is provided with a relatively small bypass passage 41 that provides continuous fluid communication between chamber 23 and passage 54.

In operation of the FIG. 2 mechanism, when the hydraulic pressure in space 23 is below a predetermined value the spring 45 and coned spring disks 47 will cooperatively urge valve element 44 to a closed position, as shown in FIG. 2; when the pressure in chamber 23 is slightly greater than the pressure in chamber 56 there is a small liquid flow through passage 41. When the hydraulic pressure in chamber 23 rises above a predetermined threshhold value the valve element will be forced away from orifice 46 to permit hydraulic flow through orifice 46 and connected passages 50 and 54. FIG. 3 illustrates the position of valve element 44 in a partially opened condition. The rate of liquid flow through orifice 46 determines the resistance to upward velocity of cylinder 18 and hence velocity of the road wheel during movement thereof in the jounce direction. FIGS. 2 through 4 illustrate the structure associated with metering valve 44; similar structure is associated with metering valve 32.

Figure 5:
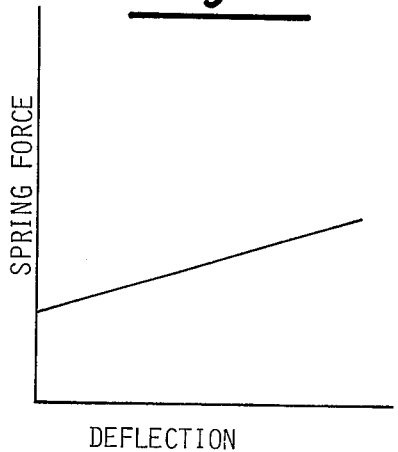
FIGS. 5 through 10 are charts illustrating load-deflection and load-flow characteristics of spring-urged valves used in the FIG. 1 suspension damper.
Figure 6:
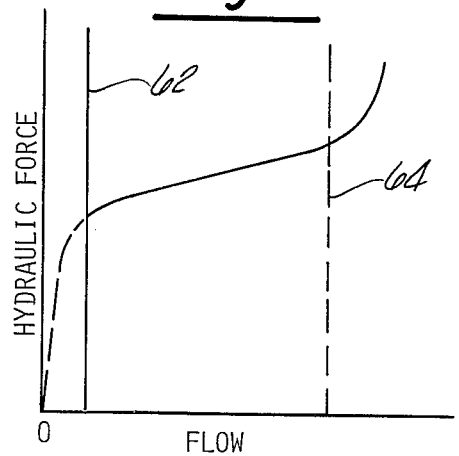

Suspensions have previously been devised that are similar to the FIG. 1 arrangement except that a single coil spring was used with each metering valve (instead of the combination spring mechanism shown in FIG. 2). FIGS. 5 and 6 indicate some characteristics of the conventional system. FIG. 5 shows the load-deflection curve for a conventional compression coil spring. The curve has a constant slope so that each added increment of hydraulic pressure force on the face of the associated poppet valve 44 (or 32) produces the same incremental displacement or deflection. FIG. 6 shows the change in flow rate across the conventional valve as the valve moves from its fully closed position 62 to its fully opened position 64; the dashed portion of the curve to the left of line 62 represents liquid flow through passage 41 (FIG. 2) prior to initiation of the main flow through orifice 46 (or 36).

Figure 7:
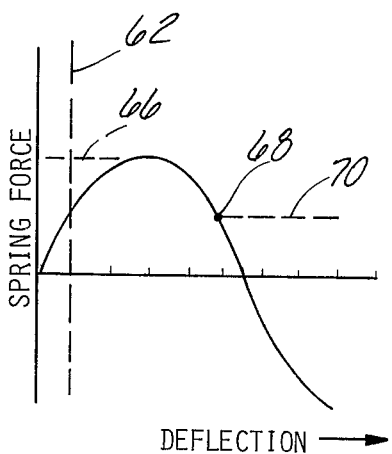

FIG. 7 illustrates the load-deflection curve for a conventional coned spring disk of the type used in the FIG. 2 valve. It will be seen that the curve has a variable slope, which contrasts with the constant slope curve for the coil spring of FIG. 5. Specifically, the FIG. 7 curve is hump shaped such that initially a relatively large force is required to produce unit deflection of the spring disk; subsequently a lesser force is required to produce each unit deflection. When the force has reached a maximum value, designated by numeral 66, no additional force is required to produce additional increments of deflection; at that point on the curve the coned disk goes over center, with a snap action. Each coned disk is selected and utilized in the FIG. 2 valve so that the disks assume flattened or bottomed conditions approximately when point 68 is reached on the load-deflection curve (FIG. 7). FIG. 3 illustrates the condition of the valve when the spring force is approximately at the snap-over point 66 (FIG. 7). FIG. 4 illustrates the condition of the valve when the coned disks are bottomed together (at point 68 in FIG. 7).

Figure 10:
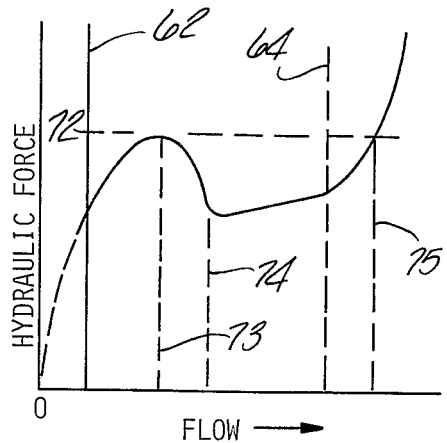
Figure 8:
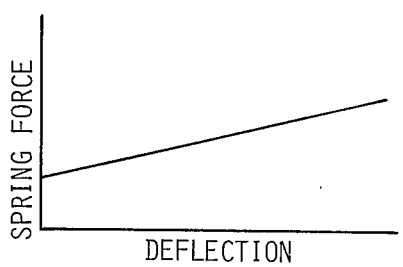
Figure 9:
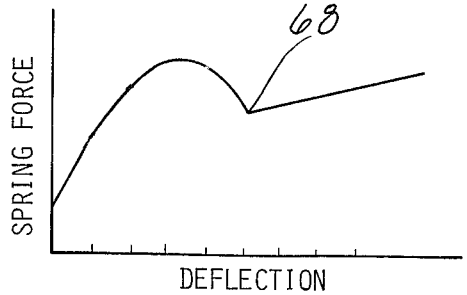

FIG. 8 illustrates the load-deflection curve for coil spring 45 used in the FIG. 2 valve. FIG. 9 represents the load-deflection curve for the composite spring system (coned disks 47 and coil spring 45). FIG. 10 shows the force-flow curve for the FIG. 9 spring system. The valve begins to open at point 62 and is fully opened at point 64. During the initial period of valve element motion (to the left of line 73) the flow increases at a relatively low rate in accordance with the steeply sloped character of the curve. When the hydraulic force of the chamber 23 liquid reaches the value designated by numeral 72 the flow increases from value 73 to value 74 without any added hydraulic force. When the flow reaches the value indicated by numeral 74 further hydraulic force is required to produce further flow increase. After the valve has reached the fully opened "saturated" position 64 flow characteristics are determined by the size of orifice 46 (or 36).

The FIG. 10 system is believed to offer improved cross country performance over the conventional spring system shown by FIG. 6. As regards response to relatively small bumps, the conventional system of FIG. 6 exerts relatively slight damping against upward acceleration forces, whereas the new system of FIG. 10 exerts a much greater damping force, hence better deceleration control. In regards to response to larger obstructions, which create greater wheel velocities, the conventional system of FIG. 6 exerts a progressively increasing dampener force such that the system is apt to go onto the relatively hard snubber portion of the curve to the right of the normal limit line 64; the result is a stiff rather harsh ride. The new system of FIG. 10 operates so that liquid flow can increase from the value designated by numeral 73 to the value designated by numeral 75 without any additional force input above the peak force 72. The relatively large flow increase (without commensurate force input) provides a relatively soft damper response to major bumps. This allows relatively high velocity, unopposed, road wheel motion within the suspension travel limits, thereby reducing disturbing force inputs to the hull.

Both the FIG. 6 and FIG. 10 systems include snubber response to obstacles which induce high wheel velocities. In FIG. 6 the snubber response is that portion of the curve to the right of line 64; in FIG. 10 the snubber response may be considered to be the portion of the curve to the right of line 75 (i.e. the portion of the curve above peak force line 72). In general, the FIG. 10 system is believed more responsive to high speed, cross country vehicle, suspension requirements.

Improved operation achieved with the FIG. 10 system is due to the structural characteristics of the metering valve shown in FIG. 2. The valve shown in FIG. 2 is somewhat similar to the valve shown in FIG. 3 of U.S. Pat. No. 2,911,072. However, the two valves are believed to function differently. The valve of U.S. Pat. No. 2,911,072 uses coned disks 60 that are selected to be stronger than coil spring 58; in my metering valve the coned disks are selected to be weaker (more resilient) than the coil spring. In the patented arrangement initial deflection will occur in the patentee's spring 58; disks 60 will deflect only after predetermined stress build-up in spring 58. The operating curve for the patented system is presumably a multi-slope curve that differs from the FIG. 10 curve (because the patentee does not use the spring disks through their popover range to produce the soft response between lines 73 and 75 in FIG. 10).

I wish it to be understood that I do not desire to be limited to the exact details of construction shown and described for obvious modifications will occur to a person skilled in the art.

I claim:

1. In a suspension for a wheeled vehicle, a hydraulic shock absorber of the piston-cylinder type; an insert (52) disposed within the cylinder below the piston; a first check valve (42) carried by the piston permitting substantially unrestriced downflow from the space above the piston to the space immediately below the piston; a second check valve (43) carried by the insert permitting substantially unrestricted upflow to the space immediately below the piston; first metering means carried by the piston permitting controlled flow from the space below the piston to the space above the piston, comprising a first orifice means (36), a first cooperating tapered poppet metering valve, and spring mechanism biasing said poppet valve to a position closing the orifice means; second metering means carried by the insert permitting controlled flow from the space above the insert to the space below the insert, comprising a second orifice means (46), a second cooperating tapered poppet metering valve, and second spring mechanism biasing the second poppet valve to a position closing the second orifice means; each spring mechanism comprising a coil spring (45) having a constant rate load-deflection curve, and a plurality of coned spring disks (47) having convexly humped load-deflection curves; the coil spring and coned spring disks being arranged in series with each other between the associated metering valve and the structure on which the valve is mounted; the coned spring disks being juxtaposed to one another so that the cones of adjacent disks face in opposite directions to enable said disks to undergo overcenter deflections to conditions bottomed against each other; the coned spring disks and constant rate coil spring being selected so that the coned disks are caused to undergo overcenter snap-type deflection before the constant rate coil spring has undergone appreciable deflection; the coned spring disks being dimensioned so that said disks bottom against each other before the associated valve reaches its fully opened condition, whereby the coil spring controls the movement rate of the valve between the point at which the coned disks bottom against each other and the point at which the valve is fully opened.

* * * * *